United States Patent [19]
Holtey

[11] Patent Number: 5,442,704
[45] Date of Patent: Aug. 15, 1995

[54] SECURE MEMORY CARD WITH PROGRAMMED CONTROLLED SECURITY ACCESS CONTROL

[75] Inventor: Thomas O. Holtey, Newton, Mass.

[73] Assignee: Bull NH Information Systems Inc., Billerica, Mass.

[21] Appl. No.: 181,691

[22] Filed: Jan. 14, 1994

[51] Int. Cl.⁶ .......................... H04L 9/32; G07F 7/08
[52] U.S. Cl. ........................................ 380/23; 235/380
[58] Field of Search .......................... 380/23, 24, 25; 235/380, 382

[56] References Cited

U.S. PATENT DOCUMENTS

| | | | |
|---|---|---|---|
| 4,819,204 | 4/1989 | Schrenk | 235/380 X |
| 4,882,474 | 11/1989 | Anderl et al. | 235/380 |
| 4,885,788 | 12/1989 | Takaragi et al. | 235/380 X |
| 5,285,200 | 2/1994 | Kuriyama | 235/380 |
| 5,313,520 | 5/1994 | Han | 380/23 |

*Primary Examiner*—Gilberto Barrón, Jr.
*Attorney, Agent, or Firm*—Faith F. Driscoll; John S. Solakian

[57] ABSTRACT

A secure memory card includes a microprocessor on a single semiconductor chip which interconnects through an internal bus to a number of non-volatile addressable memory chips. The microprocessor includes an addressable non-volatile memory for storing information including a number of key values and program instruction information. Each chip's memory is organized into a number of blocks, each block including a number of rows of byte locations. Each row of each block further includes a lock bit location, the total number of which provide storage for a lock value uniquely coded to utilize a predetermined characteristic of the memory to ensure data protection. Each memory chip is constructed to include security control logic circuits which include a security access control unit and a volatile access control memory containing a plurality of access control storage elements. Under the control of a predetermined set of instructions, the security access control unit performs a predetermined key validation operation by comparing key values against the bit contents of lock bit locations read out a bit at a time during an authentication procedure with a host computer. After the successful performance of the key validation procedure, the microprocessor sets one of the storage elements of the volatile access control memory for enabling user access to block data.

20 Claims, 8 Drawing Sheets

| ELEMENT | TYPE OF COMMAND | | | |
|---|---|---|---|---|
| | INITIALIZATION | START INST. | STEP INST. | END INST. |
| ACM 43 BLOCK STORAGE ELEMENT | RESET TO ZERO | LOAD WITH 0th BIT OF BLOCK (LMB0) | NO ACTION | SET TO ONE IF END CTR=MAX & COMPARE ACCUM=1 OR ELSE RESET TO ZERO |
| END COUNTER 30-3 | RESET TO ZERO | RESET TO ZERO | INCREMENT BY ONE IF ADDRESS BLOCK LOCK MEMORY OUTPUT BIT =1 AND ADDRESSED BLOCK LOCK MEMORY OUTPUT BIT COMPARES (EQUALS) TO PRESENTED BIT OR ELSE RESET TO ZERO | RESET TO ZERO |
| ACCUM COMP FLIP-FLOP 30-2 | RESET TO ZERO | SET TO ONE | • NO ACTION IF ADDRESSED BLOCK LOCK MEMORY OUTPUT BIT COMPARES (EQUALS) TO PRESENTED BIT OR ELSE RESET TO ZERO • RESET TO ZERO IF END COUNTER OVERFLOW OCCURS | RESET TO ZERO |
| ADDRESSED BLOCK MEMORY OUTPUT BIT | NOT SIGNIFICANT | LOAD WITH FIRST BIT OF BLOCK (LMB0) | "MIDDLE SIGNIFICANT BITS" (LMB1-LMB8191) | NOT SIGNIFICANT |
| ADDRESS LATCH COUNTER 56 | NOT SIGNIFICANT | LOAD MOST SIGNIFICANT BITS OF ADDRESS FROM INST. & MAKE MIDDLE SIGNIFICANT BITS ZERO | INCREMENT BY ONE, MIDDLE SIGNIFICANT BITS & LEAVE MOST SIGNIFICANT BITS UNCHANGED | NO ACTION |

ACTION TABLE

SECURE MEMORY CARD WITH PROGRAMMED CONTROLLED SECURITY ACCESS CONTROL

RELATED PATENT APPLICATION

The patent application of Thomas O. Holtey and Peter J. Wilson entitled, "Secure Memory Card," filed on Oct. 14, 1992, bearing Ser. No. 07/960,748, now U.S. Pat. No. 5,293,424 which is assigned to the same assignee as this patent application.

The patent application of Thomas O. Holtey entitled, "A Secure Application Card for Sharing Application Data and Procedures Among a Plurality of Microprocessors, filed on Jan. 14, 1994, bearing Ser. No. 08/181,684, which is assigned to the same assignee as this patent application.

BACKGROUND OF THE INVENTION

1. Field of the Invention

This invention relates to the field of portable personal computers and more particularly to systems for maintaining data security in a portable digital information environment.

2. Prior Art

The security of personal information has always been concern. Historically, it has been safeguarded through the use of signatures, credentials and photographs. Electronic devices such as automatic banking machines have added encoded cards and personal identification numbers (PINs) to the repertoire of security tools. Computers continue to use passwords.

More recently, the "Smart Card" has been used as a security tool. The "Smart Card" is a small microcomputer with writable, non-volatile memory and a simple input/output interface, fabricated as a single chip and embedded in a plastic "credit card". It has exterior pins to allow it be connected to specially designed equipment. The program contained in the card's microcomputer interacts with this equipment and allows its non-volatile memory data to be read or modified according to a desired algorithm which may optionally include a password exchange. Special techniques have been implemented to protect the memory data and to allow permission variations according to the situation. For example, U.S. Pat. No. 4,382,279 entitled, "Single Chip Microprocessor with On-Chip Modifiable Memory" discloses an architecture which permits automatic programming of a non-volatile memory which is included on the same chip as a processing and control unit. As in other systems, the microprocessor only protects memory on the same chip.

The "Smart Card" has been used both to facilitate the process of identification and to be the actual site of the valued information. In this situation, as in most prior situations, physical presence of a "key" as well as some special knowledge has been used as part of the verification or authentication process. In such cases, identification has involved a dialog between the person desiring access and a fixed agent such as a security guard and an automatic teller machine.

The current state of portability of free standing computing devices makes it possible for both the physical key and the authentication agent to be small, portable and hence more subject to loss or theft. Further, computing devices make it possible to perform repeated attempts to guess or deduce the special knowledge or passwords associated with the identification process. This is especially true if the authentication agent or device is also under the control of the thief. To make matters worse, technology now allows and encourages the carrying of enormous amounts of sensitive information on one's person where it is subject to mishap.

Also, today's notebook and subnotebook sized computers provide a free standing environment having significant computing power which has created a need for additional data storage capability. This need has initially been met by miniature hard disk devices which can hold both programs and data. While password protection is often used in these systems, it does not completely protect sensitive data because, first, the authentication agent is vulnerable. But, more significantly, the disk device containing the data can be physically removed and accessed in a setting more conducive to analysis. In this case, data has been protected by employing some form of encryption. The nature of disk access makes this possible without encountering undue cost or performance barriers. An example of this type of system is described in U.S. Pat. No. 4,985,920 entitled "Integrated Circuit Card".

The recent emergence of the flash memory and removable "memory cards" have allowed major reductions in size and power requirements of the portable of the portable computer. The flash memory combines the flexibility of random access memories (RAMs) with the permanence of disks. Today, the combining of these technologies allows up to 20 million bytes of data to be stored without power, in a credit card size removable package. This data can be made to appear to a host system either as if it were stored on a conventional disk drive or if it were stored in an extension of the host system's memory.

These technological developments have made further reductions in system size possible to the extent that the system and data can be carried on one's person. This has made the data and its host system more vulnerable to loss or theft and also more difficult to protect memory data by encryption since this presents major cost and performance barriers.

Accordingly, it is a primary object of the present invention to provide a portable digital system with a secure memory subsystem.

It is a further object of the present invention to provide a memory card whose contents can be protected if removed from a portable digital system.

It is still a further object of the present invention to provide a memory card in which the data contents of the chips of the card are protected if removed from such card.

It is a more specific object of the present invention to provide a secure memory subsystem which can be easily fabricated due to simplicity in design.

SUMMARY OF THE INVENTION

The above and other objects of the present invention are achieved in the preferred embodiment of a secure memory card described in the above reference related patent application to Thomas O. Holtey, et al. The secure memory card includes a microprocessor on a single semiconductor chip and one or more non-volatile addressable memory chips. The microprocessor chip and non-volatile memory chips connect in common to an internal bus for transmitting address, data and control information to such non-volatile memory chips. The microprocessor includes an addressable non-volatile memory for storing information including a number of key values and program instruction information for controlling the transfer of address, data and control information on the internal bus.

According to the teachings of the present invention, the chip memory is organized into a number of blocks, each block having a number of rows, each containing a plurality of addressable byte locations. Each row further includes a single lock bit location which collectively with the other row lock bit locations provide storage for a significant number of lock bits within each block with little increase to the size of the chip memory. The lock bits are uniquely coded to utilize a predetermined characteristic of the non-volatile memory which ensures data protection.

Also, according to the present invention, each memory chip is constructed to include security control logic circuits which include a volatile access control memory having a plurality of access control storage elements and a programmable security access control unit containing a small number of circuits for carrying out a key validation operation. More specifically, under the control of a predetermined set of instructions, the security access control unit performs a predetermined key validation operation for a protected block by serially comparing the bits of a key value against the bit contents of lock bit positions of the memory block read out in response to such instructions.

This validation operation is carried out with a host computer as part of a predetermined authentication procedure. It is only after the successful performance of such procedure, can the microprocessor set the associated volatile access control memory access control element of a block for enabling the user access to read out information from the protected block.

As in the case of the related patent application, periodically, the user can be required to successfully perform an authentication procedure with the host computer, and allowed to continue reading information as allowed by the access control memory. In the preferred embodiment, the host computer couples to the memory card through a standard interface such as an interface which conforms to the Personal Computer Memory Card International Association (PCMCIA) standards.

The security logic circuits of the preferred embodiment contain a minimum amount of logic circuits which include a number of lock bit locations corresponding to one per memory row of each block, an end counter, a comparator and a compare accumulation flip-flop and an access control memory containing one bit location or flip-flop for each memory block. The end counter is used to count successive ONE bits in the lock bit locations of a block for detecting the end of a stored key value. The comparator and compare accumulation flip-flop respectively, compares each data bit presented by an instruction to the lock bit stored in a corresponding one of the lock bit locations and accumulates the result of the series of successive comparisons made therebetween.

The present invention eliminates the need for parallel data paths, parallel data comparators and large register widths for storing long key values selected to provide greater protection against guessing. In the preferred embodiment, each block can provide a maximum key length of 8 kilobits. This is done without having to be concerned with the problems of providing wider parallel paths or large register widths. Further, with the speed of today's microprocessors, the time required to process large key lengths remains well under the sub-second range. Moreover, such processing normally only takes place during system initialization.

According to the teachings of the present invention, the key values are selected so that the first bit of every key value is set to a predetermined state which utilizes a predetermined characteristic of the memory chip. More specifically, in the memory of the preferred embodiment, when the memory is erased all bits are set to ones and writing into the memory can only change the ones to zeros but can not change the zeros back to ones. The present invention uses this characteristic by requiring that the first bit of every key be set to this predetermined state (i.e. zero) which will serve as the protection bit for each block. Further, the keys are coded according to a predetermined protocol which further ensures protection. In the preferred embodiment, the protocol uses rules similar to those utilized in a well known communications protocol such as the High-level Data Link Control (HDLC) communications protocol. That is, each key value bit sequence is coded to contain less than a predetermined number of successive ONE bits with the exception of a flag field which contains the predetermined number of successive ONE bits. If any bits of the end code are tampered with, it will not be possible to detect the end of the key value and gain access to a particular block. And, if any other bits of the key value are tampered with, there will be a mismatch between the lock and key values preventing access.

Also, according to the present invention, a small number of different types of instructions are utilized to carry out a key validation operation. These include a first type of instruction which is performed once by the microprocessor to begin a key validation operation. If the memory block is not protected, this is the only instruction required to be executed. The microprocessor executes a second type of instruction, one for each bit in the sequence of key bits. Each second type of instruction causes one bit of the key bit sequence to be compared with a corresponding lock bit of the sequence of lock bits stored in the block lock bit locations. The microprocessor completes the key validation operation by executing a third type of instruction. This instruction causes the sampling of the accumulated comparison result stored in the accumulation comparison flip-flop, tests the end counter, and sets the block access control memory bit only when the results are correct (i.e. when the counter and accumulation comparison flip-flop are in the correct states).

Also in the preferred embodiment, the same set of instructions can be modified when required to be used during the fabrication of the memory card or during a selective block erase operation. That is, instead of reading out the bits of a key value, the instructions can be used to cause the writing of the key value bit sequence into the lock bit positions of a memory block following an erase operation.

The present invention expands the capabilities of the secure card of the related patent application by providing an independent lock for each block of memory. Also, it permits the use of variable length key values as a function of the amount of protection to be accorded to the information being protected. Further, the present invention requires substantially less circuitry, making it easier to construct and less costly. As in the case of the related patent application, it melds the "Smart Card" and "memory card" technologies which is key to allowing the protection of large amounts of data made possible by flash memory technology in the "security harsh" environments created by electronic miniaturization.

The present invention also retains the features of the secure card of the related patent application relative to being capable of operating in both secure and non-secure modes, eliminating the need for encrypting and decrypting data, and protecting memory data if the card or its host processor is lost, stolen, powered off or left unattended. In the event of theft, the memory data is protected from access even if the memory card is opened and probed electronically or the memory chips are removed and placed in another device.

The above objects and advantages of the present invention will be better understood from the following description when taken in conjunction with the accompanying drawings.

DESCRIPTION OF THE PREFERRED EMBODIMENT

Figure 1:
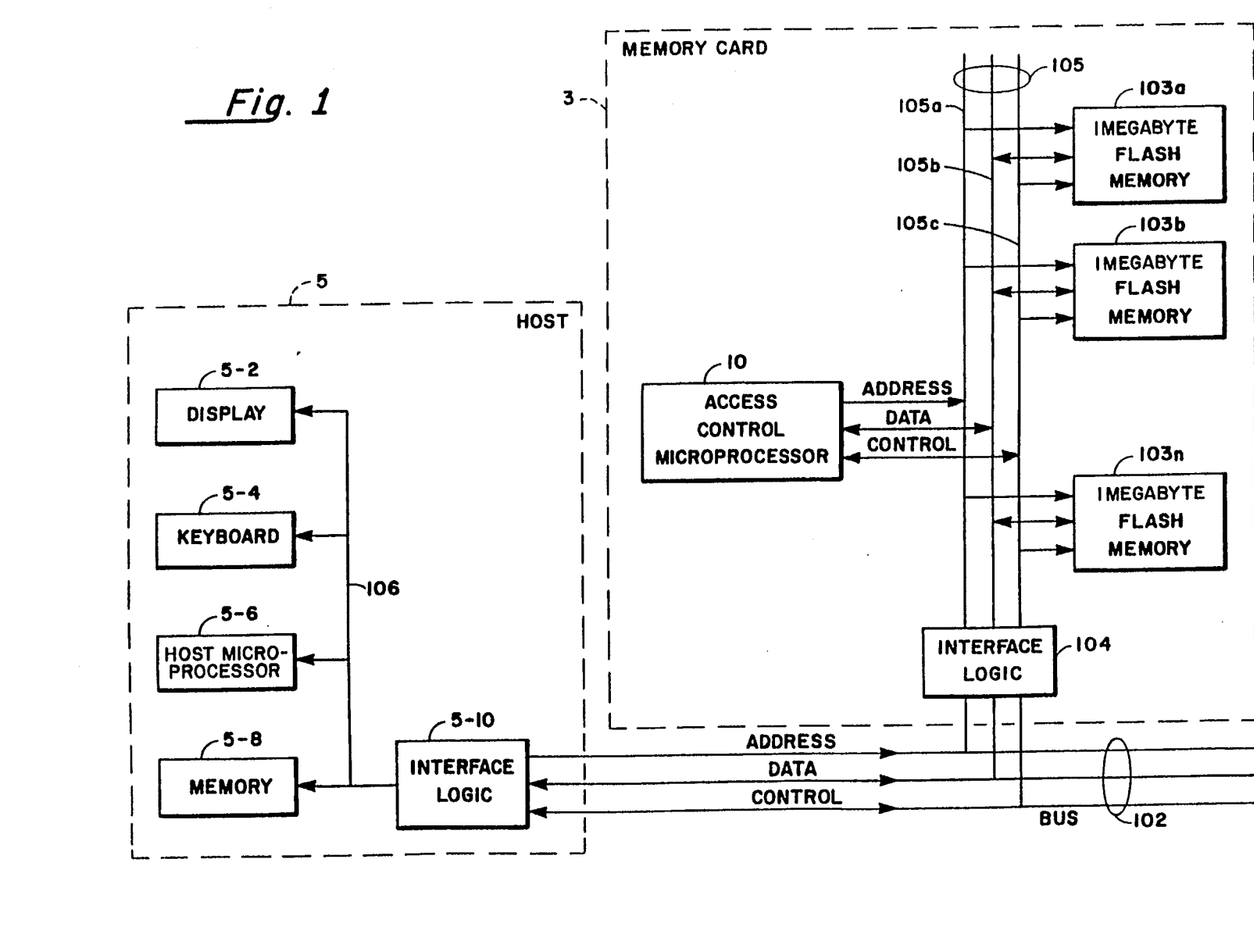
FIG. 1 is a block diagram of a system which incorporates a memory card constructed according to the present invention.

FIG. 1 is a block diagram of a secure portable handheld computing system 1 usable as a personal computer or as a transaction processor. System 1 includes a memory card 3 constructed according to the present invention which connects to a host processor 5 by a bus 102. The host processor 5 may take the form of a palm top personal computer, such as the HP 95LX manufactured by Hewlett-Packard Company. The host processor 5 includes a liquid crystal display (LCD) 5-2, a keyboard 5-4, a memory 5-8, and a serial interface 5-10, all coupled in common to a bus 106. The memory 5-8 includes a one megabyte read only memory (ROM) and a 512 kilobyte random access memory (RAM).

The connection between the memory card 3 and host processor 5 is established through a standard bus interface. In the preferred embodiment, the bus 102 conforms to the Personal Computer Memory Card International Association (PCMCIA) standard. The interface 102 provides a path for transferring address, control and data information between host processor 5 and the memory card system 3 via a standard interface chip 104 and a memory card bus 105. Each of the buses 102, 105, and 106 include a data bus, a control bus and an address bus and provide continuous signal paths through all like buses. For example, bus 105 includes address bus 105a, data bus 105b, and control bus 105c.

The PCMCIA bus standard has evolved from a standard which supports disk emulation on memory cards to a substantially different standard which allow random access to memory data. The memory card of the present invention provides a protection technique which supports this new standard by providing rapid access to random memory locations without resort to encryption techniques. By controlling the data paths which carry the data from the memory array to the host, the memory card of the present invention protects the data without imposing any time-consuming buffering, decryption or other serial processing in this path.

Typically, a user operates system 1 from the keyboard 5-4 to perform the typical operations such as spreadsheet and database functions which display information on display 5-2 and update information stored in files in memory card 3. The host processor 5 sends address information over bus 102 to retrieve information and if desired, updates the information and sends it, along with the necessary address and control information back to memory card 3.

As shown, in FIG. 1, the memory card 3 of the present invention includes an access control processor (ACP) 10 which couples to bus 105 and a number (n) of CMOS flash memory chips 103a through 103n, each coupled to bus 105. ACP 10 is typically the same type of processing element as is used in the "Smart Card". The CMOS flash memories 103a through 103n may take the form of flash memory chips manufactured by Intel Corporation. For example, they may take the form of the Intel flash memory chip designated as Intel 28F001BX 1M which includes eight 128 Kilobyte×8-bit CMOS flash memories. Thus, a 4 Megabyte flash memory card could include 32 such flash memories (i.e. n=32). For further information regarding flash memory components, reference may be made to the article entitled, "Flash Memory Goes Mainstream," published in the October, 1993 issue of the IEEE Spectrum publication.

ACCESS CONTROL PROCESSOR 10

Figure 2:
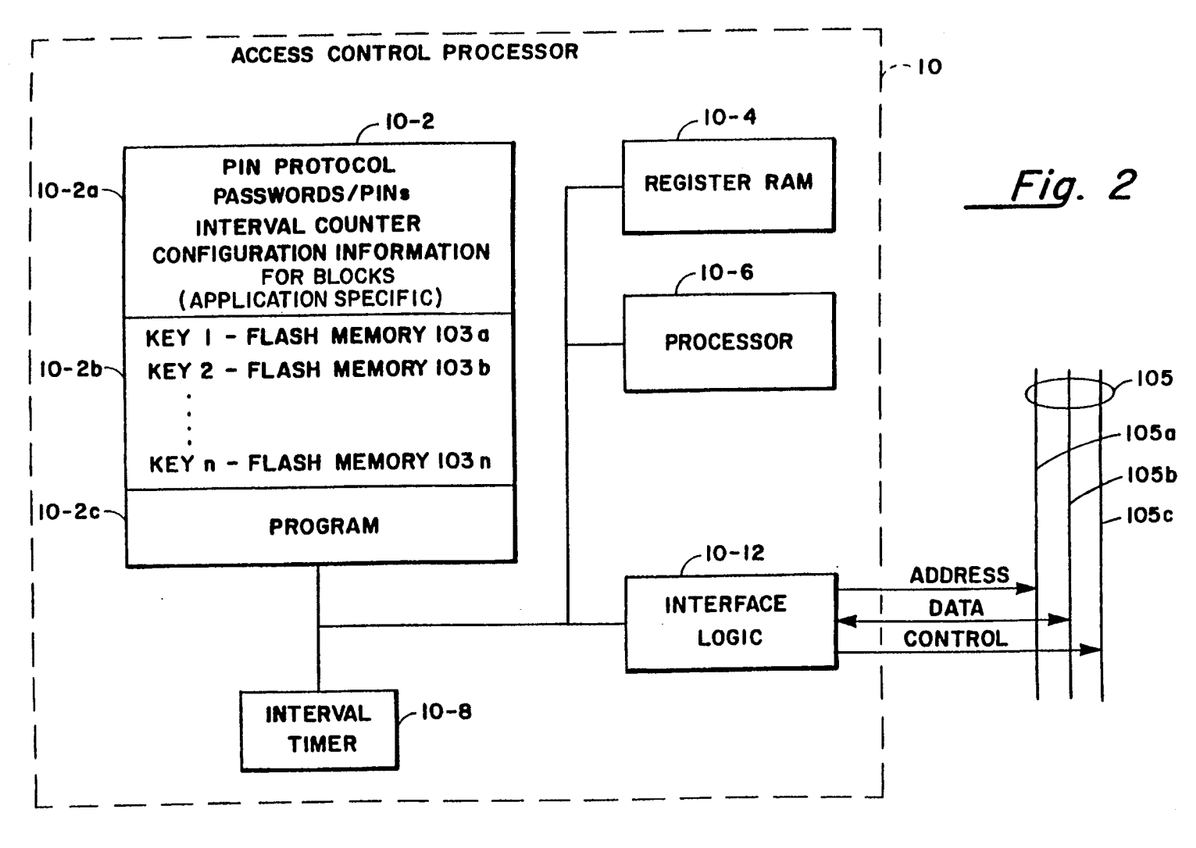
FIG. 2 shows in greater detail, the access control processor (ACP) of FIG. 1 including the organization of its non-volatile memory.

FIG. 2 shows in block diagram form, the access control processor (ACP) 10 of the preferred embodiment. As shown, ACP 10 includes a protected non-volatile memory 10-2, a random access memory (RAM) 10-4, a microprocessor 10-6, an interval counter 10-8 and an interface block 10-10 connected to bus 105. Non-volatile memory 10-2 dedicates a number of addressed locations in which to store authentication information and programs. More specifically, memory locations 10-2a store one or more personal identification numbers (PINs), protocol sequences or other identification information for verifying that the user has access to the system, and for identifying the blocks in flash memories 103a through 103n that the user may access in addition to a time interval value used for reauthentication.

Memory locations 10-2b store the key values used for protecting each of the flash memories 103a through 103n or the codes used to protect the individual blocks of each of the flash memories 103a through 103n. Memory locations 10-2c store the program instruction sequences for performing the required authentication operations and for clearing the system if the preset conditions for failure are met.

Certain program instructions enable the user to control the setting of the interval counter 10-8 which establishes when user reauthentication takes place. The reauthentication interval defines the time between interruptions and for sending an interrupt to the host processor 5 requiring verification of the user's identity by having the user reenter the PIN or other password. The interval counter 10-8 receives clock pulses from the host processor 5 over bus 102 and can be set by the user according to the work environment. For example, at home, the user may turn the timer off (i.e., set it to a maximum value), or set the time interval to one hour. On an airplane the user may set it for ten minutes for increased protection. The user can be prompted to reexamine the setting of this interval at every "power on" thereby forcing periodic reauthentication to enforce security.

FLASH MEMORIES 103a through 103n

Figure 3:
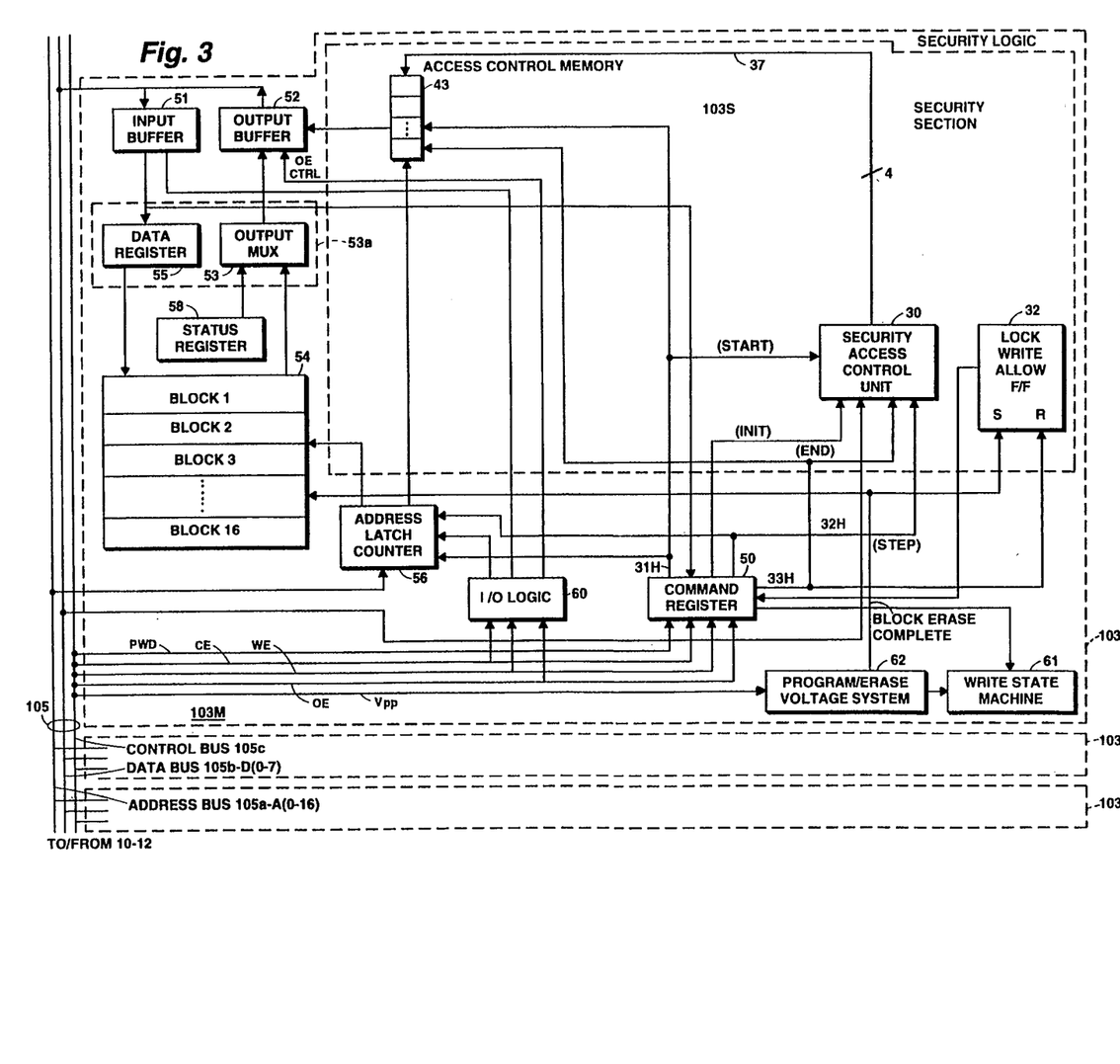
FIG. 3 shows in block diagram form the standard flash memory of FIG. 1 modified according to the teachings of the present invention.

FIG. 3 shows in block diagram form, flash memory 103a which is identical in construction to the remaining flash memories 103b through 103n. As shown, memory 103a includes two sections, a memory section 103M organized according to the present invention and a security logic section 103S containing the security access control circuits of the present invention. Both sections are shown in greater detail in FIG. 4.

Memory Section 103M

Figure 4:
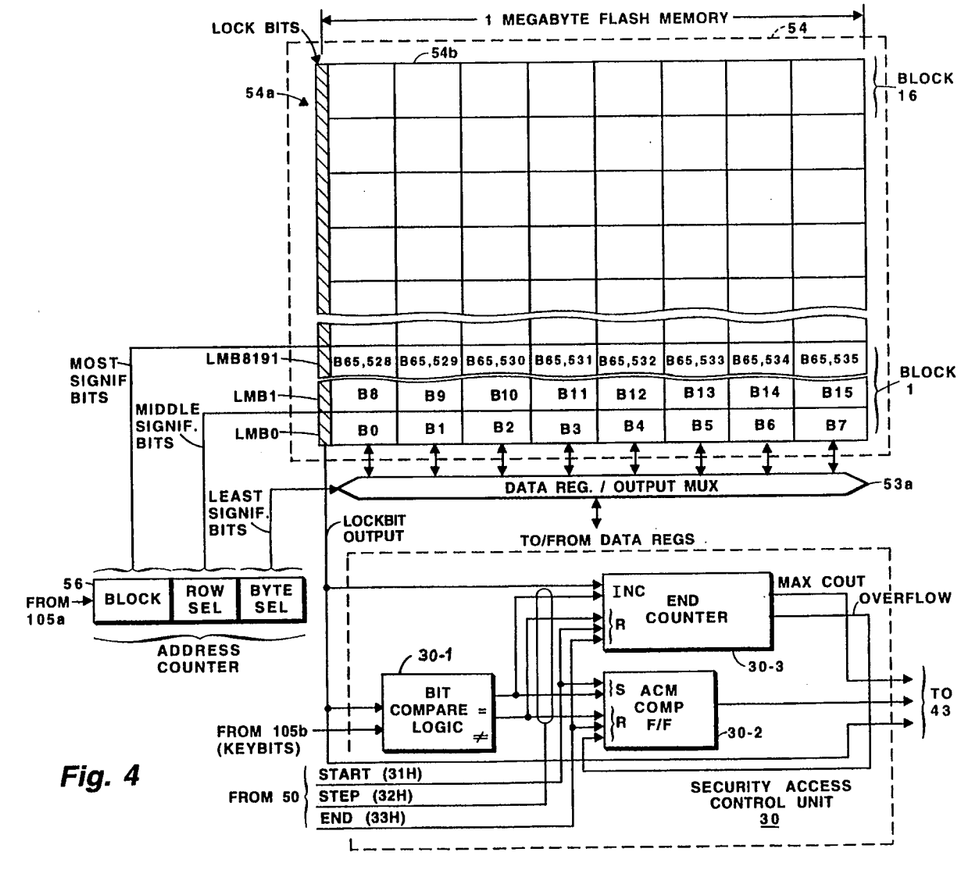
FIG. 4 shows in greater detail, the flash memory of FIG. 3 constructed according to the teachings of the present invention.

As seen from FIG. 3, section 103M includes a memory array 54 organized into sixteen blocks as shown in FIG. 4, a command register 50, input/output logic circuits 60, an address counter 56, a write state machine 61, an erase voltage system 62, an output multiplexer 53, a data register 55, an input buffer 51, an output buffer 52, and a status register 58, arranged as shown. The basic logic circuits of flash memory 103a, as discussed above, take the form of the type of circuits included in flash memories manufactured by Intel Corporation. Since such circuits can be considered conventional in design, they will only be described to the extent necessary. For further information regarding such circuits, reference may be made to the publication entitled, "Memory Products," Order Number 210830, published by Intel Corporation, dated 1992 as well as other publications of Intel Corporation.

As shown in FIG. 3, the flash memory circuits receive a plurality of input address signals A0–A16, data signals D00–D07 and control signals consisting of chip enable, write enable, output enable, power down and erase/program power supply signals CE, WE, OE, PWD, and VPP respectively. The functions performed by these signals are described in Appendix I.

The CE, WE and OE signals are applied to command register 50 and I/O logic block 60 from host processor 5 via bus 102 and control bus 105b and dispersed to control the indicated logic blocks. The PWD signal is also applied to command register 50 for enabling the flash memory to perform the operations described in Appendix I. Also, this signal can be used to clear the volatile storage elements of section 103S as desired thereby enforcing user reauthentication when normal operation is again resumed.

Generally, the basic logic elements of section 103M operate in the following manner. Information is stored in memory array 54 via data bus 105a, input buffer 51 and data register 55 at an addressed location of one of the memory blocks specified by the address received by address counter 56 from address bus 105c. Information is read from a specified addressed location of a block of memory array 54 and is sent to host processor 5 via an output multiplexer 53, output buffer 52, data bus 105a and bus 102. A status register 58 is used for storing the status of the write state machine, the error suspend status, the erase status, the program status and the VPP status.

The write state machine 61 controls the block erase and program algorithms. The program/erase voltage system 62 is used for erasing blocks of the memory array 54 or the programming bytes of each block as a function of the voltage level of VPP.

Security Section 103S

As seen from FIG. 3, section 103S includes a security access control unit 30, shown in greater detail in FIG. 4, a lock write allow storage element 32, and a volatile access control memory 43 interconnected as shown. The output of the access control memory 43 is applied as an enabling input to output buffer 52 during each memory read cycle when the contents of a byte location of any block of memory array 53 is being read out. That is, a read cycle may occur, however, the data read out is inhibited from passing through output buffer 52 in the absence of the appropriate block's access control memory gating signal.

More specifically, in the preferred embodiment, access control memory 43 includes sixteen individually addressable bit storage elements, an input address 4 to 16 bit decoder connected to the input of each storage element and a 1 to 16 output multiplexer circuit connected to the output of each storage element. The four high or most significant bits of each address of certain types of instructions added to the set of memory commands described herein, are decoded and used to select the storage element for the block whose contents are to be changed. Similarly, the same four bits are used to select the output of the storage element for the block containing the memory location being read.

It will be noted that this section receives command control signals designated by various hexadecimal values (i.e. 31H through 33H) from command register 50 of section 103M. These signals indicate the different data values of the set of commands received by command register 50 from ACP 10 via data bus 105b. As described later herein, these commands are an important extension to the sets of commands used by the flash memory. The standard flash memory commands take the form of the commands utilized by the Intel Corporation flash memories.

DETAILED DESCRIPTION OF SECTIONS 103M AND 103S-FIG. 4

FIG. 4 shows in greater detail, the organization of sections 103M and 103S. As shown, the memory array 54 has two sections, a lock bit section 54a and a data section 54b. In greater detail, memory 54 contains 1 megabytes of storage and, as indicated above, is organized into 16 blocks. Each block contains 8K rows and each row contains 8 byte locations. According to the present invention, one bit location has been added to each row to form lock bit section 54a. By extending the number of bit locations in each row from 64 to 65 bits, memory array 54 is able to store both data and associated lock bit information for protecting such data as described herein.

As shown, both sections are addressable via address latch counter 56 which is organized into three sections. A first register section is used to store the most significant group of address bits designating which block is being addressed. A second section is constructed to operate as a both a register and a counter and is used to store and increment by one, the middle significant group of address bits designating which row of a block is being addressed. A third register section is used to store the least significant group of address bits designating which byte of a row is being addressed. A multiplexer/demultiplexer circuit 53a which includes the circuit of block 53 is used to select the byte location to be written into or read as a function of the least significant address bits stored in address latch counter 56.

Also, as shown in FIG. 4, security access control unit 30 of section 103S includes a bit compare logic circuit 30-1, an accumulator compare flip-flop 30-2 and an end counter 30-3 arranged as shown. The bit compare logic circuit 30-1 is connected to receive as inputs, the lock bit contents of the lock bit locations of section 54a and key bits applied by ACP 10 via bus 105b. The comparator circuit 30-1 compares each key bit presented by ACP 10 to the corresponding lock bit read out from lock bit section 54a and applies the results of the comparison as an input to accumulator compare flip-flop 30-2 as shown. The flip-flop 30-2 accumulates the results of successive comparisons. End counter 30-3 is a small counter (e.g. 3 bit) which counts the number of successive ONE bits occurring in the string of lock bits used to detect the end of the stored key value.

The lock write allow flip-flop element 32 connects to command register 50 and to the program/erase voltage system. As discussed herein, whenever a block erase operation is performed, flip-flop 32 is set to a binary ONE state at the completion of the erase operation. The output of the flip-flop 32 is applied as an input to command register 50 and establishes when information is allowed to be written into the lock bit locations of a memory block.

As indicated, different elements of security access control unit 30 receives commands from command register 50. As mentioned above, these commands are an important extension to the sets of commands normally used by flash memory 54. The commands used by the present invention will now be described. These instructions are described in greater detail in Appendix II and now will be discussed.

The first type of instruction or command is a start command which is performed by ACP 10 at the beginning of a key validation operation for a given block. This instruction causes the first bit (LMB0) of the block to be strobed into the access control storage element of the access control memory 43. The start instruction also causes the end counter 30-3 to be reset to zero and to set the accumulation compare flip-flop 30-2 to a predetermined state (binary ONE state) for indicating that a comparison failure has not occurred. The start instruction also causes the most significant address bits and middle address bit applied via address bus 105a to be loaded into address counter 56 and ensures that the middle address bits are all zero for addressing the first bit (lock bit) within the block. The least significant address bits are ignored.

The second type of instruction is a step instruction which is performed during a block key validation operation once for each bit in the sequence of key bits. If there are n key bits in each protected block, then ACP 10 will execute n second instructions for each key validation operation. Each step instruction causes the middle significant bits of the address counter 56 to be incremented by one for readout of a next lock bit from the block's lock bit locations. Accordingly, the address presented by each step instruction is ignored.

The step instruction also causes the sampling of the outputs of the bit compare logic circuit 30-1 for storage of the results of comparing a key bit presented by ACP 10 with the next lock bit read out from the memory block. Further, it increments the end counter 30-3 by one when the lock bit read from the memory block contains a one and it compares to the key bit presented by ACP 10. When the lock bit read out from the memory block is a zero, then the step instruction causes the end counter 30-3 to be reset to zero. Also, when there is a miscompare, the step instruction resets the accumulation compare flip-flop to zero.

The third type of instruction is an end instruction which is performed once by ACP 10 to close the key validation operation. This instruction causes the sampling of the states of accumulation compare flip-flop 30-2 and end counter 30-3. When both are in the correct states, the end instruction sets the block's access control element of memory 43. More specifically, when the end counter 30-3 has reached a maximum count which is signaled by the generation of an overflow output signal and the accumulation compare flip-flop 30-2 in still in a binary one state signaling no miscompare, then the end instruction causes the setting of the access control element of memory 43 designated by the most significant address bit contents of address counter 56.

It will be noted that the above discussed instructions are also used in conjunction with block erase operations which take place during card initial loading or fabrication and during selected block erasures. The operations initiated during these modes of operation are also described in the action table of FIG. 5 and Appendix II. These operations will be discussed later herein in connection with FIGS. 6a and 6c.

DESCRIPTION OF OPERATION

The operation of the secure memory card of the present invention will now be described with particular reference to the action table of FIG. 5 and the flow diagrams of FIGS. 6a through 6c. The sequence of steps involved in the fabrication or in the initial loading of the memory card are shown in FIG. 6a. This sequence is utilized to customize the card for a given application. Before describing this operation in detail, the selection of key values and the memory erase process will first be described.

During card fabrication or alternatively as a part of an initial loading operation, the ACP 10 sets the lock values for each of the memory chips on the memory card. It does this by loading the key values into the lock bit locations of each block of each memory 54 of FIG. 4. These values are stored in the ACP's protected nonvolatile memory 10-2 (i.e. keys 1-n in FIG. 2). Also, the ACP 10 will have been loaded with configuration information pertaining to the memory's structure and the protection levels to be applied to each memory block.

As previously discussed, the key values for the protected memory blocks are selected according to rules similar to those of the HDLC protocol. Each key value can be of any length storable within the allocated block lock memory area and begins with a binary ZERO value followed by the selected sequence of ones and zeros which terminate in a string or sequence of 7 ONE bits. Thus, the sequence except for the last 7 ones is coded so that it does not contain more than 6 consecutive one bits.

Before key writing or loading takes place, the flash memory 43 must be first erased. This is done to utilize the inherent writing characteristic of the flash memory to protect the data stored therein. That is, it allows the first bit (0th) in each group of lock bit locations of each block which is to be protected to be set to a zero state. As these elements are non-volatile in that they cannot be changed from a zero state to a one state unless the entire block is erased in order to change its contents.

The Erase Process

In the preferred embodiment, the flash memory 43 is erased on a block by block basis. This enables a similar erasing process to be used during memory card fabrication or loading and to perform selective block erase operations during card operation. When a block is erased, all of its data including the lock bits stored in the lock storage area are set to ONEs. If it is desired to protect the block, a new lock value must be written at this time. That is, it would violate security to allow the lock bits to be written at an arbitrary time. Therefore, the lock write allow flip-flop 32 was included to assure that lock bits are only written immediately following a block erase operation.

During a block erase, the most significant bit positions of the address register counter 56 hold the address of the block being erased. At the completion of the erase operation, the flip-flop 32 is set to a binary ONE state. When set, this flip-flop causes the modification of the operation of the start and step instructions so as to cause the bits presented by such instructions to be written into the lock bit positions in lieu of being compared to them. Any instruction except the start and step instructions will cause the resetting of the flip-flop 32. Thus, an end instruction is used to reset the lock write allow flip-flop 32 for terminating the lock bit write operation. Also, in this case, the end instruction also sets the ACM storage element for that block to a binary ONE state, thus allowing access to that block.

If a block is not to be protected according to the configuration information held in the ACP 10 memory, the execution of any instruction except the start and step instructions will inhibit lock bit writing by causing the resetting of the lock write allow flip-flop 32. The execution of a start instruction will then transfer the 0th lock bit which equals ONE to the ACM storage element, thus enabling access.

Card Fabrication

FIG. 6a illustrates how ACP 10 sets the lock values for each of the memory chips on the memory card. It does this by loading the key values into the lock bit locations of each block of each memory of FIG. 4. As indicated in blocks 600 and 602 of FIG. 6a, the key writing/loading operation carried out during card fabrication is begun by addressing the first flash memory block followed by the erasure of that memory block. The ACP 10 determines from the configuration information defining the memory's protection levels if the block is be protected. If it is not to be protected, the ACP 10 simply loads its contents as indicated in block 614 of FIG. 6a.

But if the block is to be protected, ACP 10 causes the execution of a sequence of start, step and end instructions (i.e. blocks 606–610) for writing the bits of the key value for the block into its lock bit locations. That is, the execution of the start instruction causes a binary ZERO to be written into lock bit position LMB0 of the first memory block as indicated by block 606 of FIG. 6a. As indicated in block 608 of FIG. 6a, the execution of each step instruction causes a next bit of the key value stored in ACP 10 memory to be written into the next lock bit location (e.g. LMB1) of the first block. If there are more key bits to be written into the lock bit positions of the first block, ACP 10 causes the execution of another step instruction. Step instructions are executed until the ACP 10 determines that all of the bits of the stored key value have been written into the lock bit positions of lock memory area for the first memory block. The ACP 10 makes the determination by detecting that 7 consecutive ONES have occurred signaling the end of the key value.

As indicated in block 612 of FIG. 6a, upon completing the writing of the key value, the ACP 10 executes an end instruction which sets the corresponding ACM storage element for the first block to a binary ONE state for allowing access to the block. Next, the first block is loaded with the appropriate data or procedure information for the particular application. As indicated in FIG. 6a, the operations of blocks 602 through 614 are repeated for each block until all of the memory blocks of all of the chips have been processed.

As in the case of the related patent application, during user customization, the user establishes parameters for the frequency and mode of authentication and specific data required (e.g. personal identification numbers (PINs)). This information is also stored in the ACP's memory. At this point, the secure memory card is ready to be powered up and conduct an authentication procedure.

As in the case of the related patent application, a first authentication dialog may be initiated by ACP 10. That is, ACP 10 using the services of its host processor 5, prompts the user and receives authentication information such as a PIN or other identifying information from the user. If authentication is unsuccessful, no operation is performed. If the authentication is successful, then a first key validation operation is performed by ACP10 for each block to be protected. When the validation operation is successfully performed, then the ACP 10 enables access to the block by setting the corresponding access control storage element in access control memory 43.

As a further step, periodically, according to the user's configuration, the ACP 10 may prompt an additional user authentication (reauthentication). In the event of failure, the ACP 10 forces all memory chips to their power on states, thus inhibiting any access to the memories' data by clearing the contents of access control memory 43.

Power Up Process

Now the key validation operation of the present invention will now be described relative to FIG. 6b. As shown, the validation operation is performed as part of the normal power up operation. As shown in block 620, the power up sequence involves the initialization of the different elements of security section 103s, such access control memory 43, accumulation comparison flip-flop 30-2 and end counter 30-3. The key validation operation is performed by the execution of the sequence of instructions and operations indicated in FIG. 6b which cause the series of actions shown in the table of FIG. 5.

Figure 5:
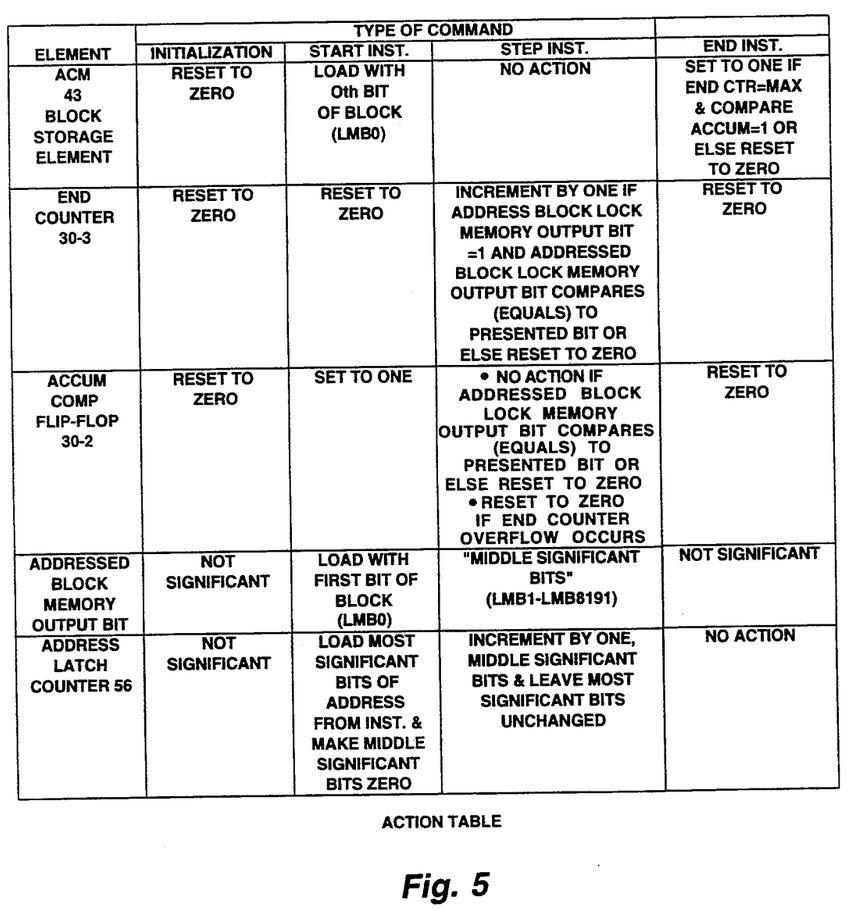
FIG. 5 is a table used to explain the operation of the memory card of the present invention.
Figure 6A:
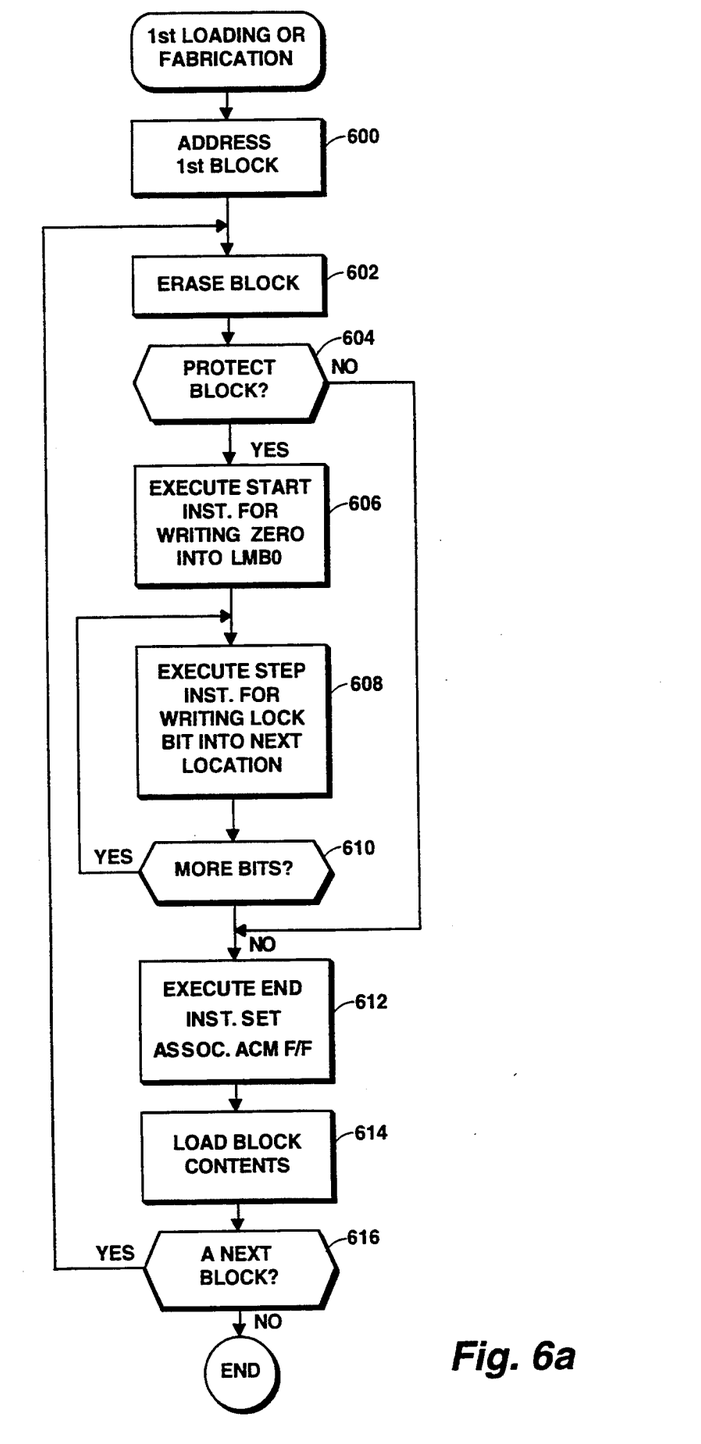
FIGS. 6a through 6c are flow charts used to explain the modes of operation of the memory card of the present invention.
Figure 6B:
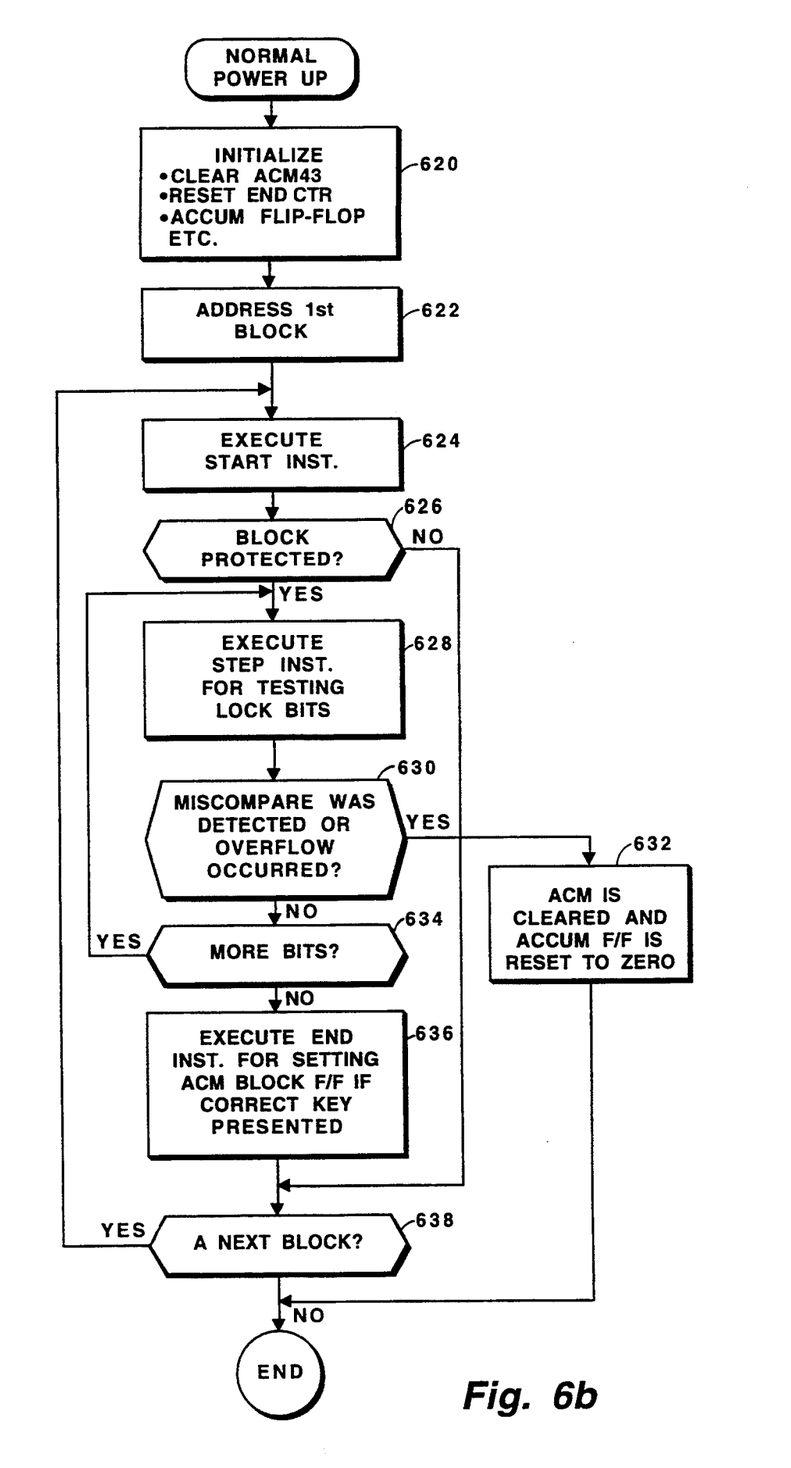

Referring to FIG. 6b, it is seen that following initialization, ACP 10 addresses the first memory block and performs the operations of block 624 by first executing a start instruction. As indicated in the table of FIG. 5, this causes the most significant address bits of the start instruction to be loaded into address latch counter 56. At the same time, the middle address bits are forced to all zeros for readout of the contents of the first bit location corresponding to bit LMB0 The contents of bit LMB0 are in turn loaded into the control access storage element of control memory 43 associated with the first block. If the first block is to be protected, the control access storage element is set to a binary ZERO state. This ensures that the data contents of the block remain protected during the key validation process. But if the block is not protected, the element is set to a binary ONE state. Also, the end counter 30-3 is reset to zero while the accumulation compare flip-flop 30-2 is set to a binary ONE state.

If the block is not being protected, the start instruction is the only instruction required to be executed. That is, the ACM block storage flip-flop designated by the start instruction is set to a binary ONE as a result of strobing the binary ONE state of the first bit position (LMB0) into that flip-flop. Assuming that the first block is protected, ACP 10 then begins executing a plurality of step instructions, corresponding in number to the number of bits in the key sequence which it can determine by examining the bits of the key value for that block stored in its non-volatile memory as discussed above.

As seen from the table of FIG. 5, each step instruction causes the middle address bits stored in the address latch counter 30-3 to be incremented by one for readout of the next lock bit location LMB1. The contents of the location LMB1 is compared with the key bit presented by ACP 10 which is the first key bit of the sequence to be compared. If both compare identically, then no action is taken to change the state of accumulation compare flip-flop 30-2 and it remains in a set state. But if there is a miscompare, then the flip-flop 30-2 is reset to a binary zero. The step instruction also causes end counter 30-3 to be incremented by one if the lock memory bit read out (LMB1) is a binary one and it compares with the key bit being presented. If there is no comparison indicating a miscompare, then end counter 30-3 is reset to zero.

Additionally, if end counter 30-3 exceeds its maximum count causing an overflow to occur, this will also cause compare flip-flop 30-2 to be reset to a binary ZERO state. When the end counter 30-3 is incremented beyond its maximum value, this is an indication that ACP 10 is attempting a comparison beyond the extent of the lock bits. Since this should never occur during normal operation, the compare accumulation flip-flop 30-2 is reset to ZERO to further inhibit the occurrence of a successful match ensuring greater security.

Assuming that there is no miscompare, ACP 10 continues by executing a next step instruction which repeats the series of actions described above. During such execution, each successive one bit will cause end counter 30-3 to be incremented by one. Therefore, just prior to the execution of the nth step instruction, end counter 30-3 should have counted 6 successive one bits. The execution of the nth step instruction in the absence of no miscompare and no overflow will cause the end counter to be incremented to its maximum count of 7 resulting in an output being generated.

Following the execution of the nth step instruction, ACP 10 then executes an end instruction for completing the key validation operation. This instruction causes the states of the end counter 30-3 and accumulation compare flip-flop 30-2 to be sampled for determining if the results are correct. If they are both in binary one states, then ACP 10 causes the access control element for the block to be set to a binary ONE. If the results are not correct, then ACP 10 resets the access control element to a binary ZERO state. Also, as indicated in the table of FIG. 5, the end instruction causes both end counter 30-3 and accumulation compare flip-flop 30-2 to be reset.

As shown in FIG. 6b, the above described key validation operation is repeated for each of the remaining blocks to be protected. At the conclusion of the key validation process, the secure memory card is ready to begin memory operations as described above. If during such operations, a user wants to store new information within a memory block, the ACP 10 will carry out the sequence of operations illustrated in FIG. 6c. As shown, the address of the selected block will be loaded into address register counter 56. The erase will be performed in a conventional manner on the block designated by the most significant address bits contained in counter 56. At the completion of the erase operation signaled by the circuits of block 62 of FIG. 3, an output signal is generated which causes the setting of lock write allow flip-flop 32 to a binary ONE state.

Figure 6C:
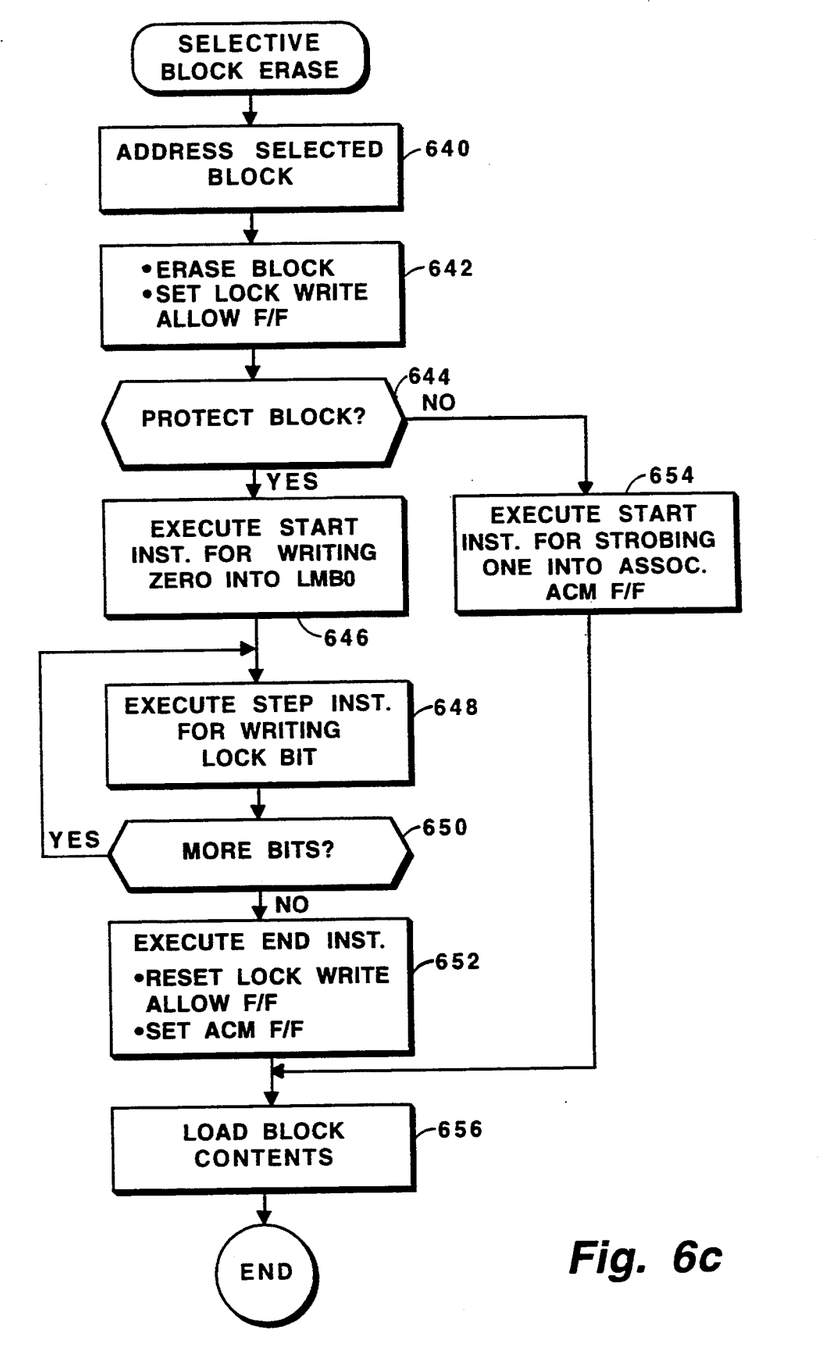

Next, as indicated by block 644 of FIG. 6c, ACP 10 determines from the stored configuration information if the erased block is to be protected. If it is protected, the ACP 10 will execute a start instruction. Since the write lock allow flip-flop 32 is set, it will modify the operation of the start instruction so that it causes a binary ZERO to be written into the first bit position (LMB0) of the lock memory area of the selected block in lieu of performing a compare operation. Next, as indicated by blocks 648 and 650, the ACP 10 will execute a number of step instructions for writing the bits of the key value presented by the step instructions into the lock bit positions of the selected block until all of the bits have been written, signaled by the detection of 7 consecutive ONE bits.

At the conclusion of the writing operation, ACP 10 executes an end instruction which resets the lock write allow flip-flop 32 to a binary ZERO state. Also, the end instruction causes the setting of the ACM storage element associated with the block to a binary ONE state for allowing access. If the block is not to be protected as per the configuration information, the execution of any instruction will inhibit the writing of lock bits by causing the resetting of the lock write allow flip-flop 32. Next, as indicated by block 654 of FIG. 6c, the ACP 10 executes a start instruction which operates in the normal way to transfer the 0th lock bit read out from the selected block and strobe it into the ACM storage element associated with that block.

The above has shown how the present invention is able to provide a highly producible and programmable key validation system. It will be appreciated by those skilled in the art that many changes may be made to the preferred embodiment of the present invention without departing from its teachings. For example, the invention may be used with different types of non-volatile memories and different interfaces, etc. Also, the present invention can be used with memories having block sizes that are very small wherein it may be desirable to have more than one lock bit per memory for providing a sufficiently large key without substantially increasing the complexity of the security access control unit.

APPENDICES

Appendix I

APPENDIX I

SIGNAL DESCRIPTIONS

| Symbol | Name and Function |
|---|---|
| A0–A16 | ADDRESS INPUTS for memory addresses. Addresses are internally latched during a write cycle. |
| D00–D07 | DATA INPUTS/OUTPUTS: Inputs data and commands during memory write cycles; outputs data during memory and status read cycles. The data pins are active high and float to tristate off when the chip is deselected or the outputs are disabled. Data is internally latched during a write cycle. |
| CE | CHIP ENABLE: Activates the device's control logic, input buffers, decoders and sense amplifires. CE is active low, CE high deselects the memory device and reduces power consumption to standby levels. |
| PWD | POWERDOWN: Puts the device in deep powerdown mode. PWD is active low; PDW high gates normal operation. PWD = VHH allows programming of the memory blocks. PWD also locks out erase or write operations when active low, providing data protection during power transitions. |
| OE | OUTPUT ENABLE: Gates the device's outputs through the data buffers during a read cycle. OE is active low. |
| WE | WRITE ENABLE: Controls writes to the command register and array blocks. WE is active low. Addresses and data are latched on the rising edge of the WE pulse. |
| Vpp | ERASE/PROGRAM POWER SUPPLY for erasing blocks of the array or programming bytes of each block. Note: With Vpp < VPP1 Max, memory contents cannot be altered. When Vpp is at a high level, programming can take place; if Vpp is at a low level, the memory array 54 functions as a read only memory. |

Appendix II

APPENDIX II

TABLE OF EXTENDED INSTRUCTIONS

| Commend | First Bus Cycle | | | Second Bus Cycle | | |
|---|---|---|---|---|---|---|
| | Operation | Address | Data | Operation | Address | Data |
| Start-LWE = 0 (1) | Write | Block (2) | 31 H | | X | LMB0 (3) |
| Step-LWE = 0 | Write | X | 32 H | Write | X | Key Data Bit (4) |
| End-LWE = 0 | Write | X | 33 H | | X | X |
| Start-LWE = 1 | Write | | 31 H | | X | LMB0 |
| Step-LWE = 1 | Write | X | 32 H | Write | X | Lock Data Bit (5) |
| End-LWE = 1 | Write | X | 33 H | | X | X |

(1) LWE is Lock Write Enable.
(2) Most Significant Bits of Address are the Block Address, the remaining bits are ignored.
(3) LMB0 is First Bit in Lock Memory Array.
(4) One Bit of Key Data presented for Comparison.
(5) One Bit of Lock Data presented for Writing.

Start Instruction (31H)

This command is performed once by the ACP 10 to begin a key validation operation. If the block is not protected (i.e., first lock bit is a ONE), only this one instruction is required for validation. When this instruction is performed and the lock write enable flip-flop is in the set state, it causes the bit presented by the instruction to be written into the designated first lock bit location (0th) of a memory block. In this case, the MSBs of the address are not loaded into the address register as the block addressed is the same as that of the previous erase operation.

Step Instruction (32H)

This command is performed once for each bit in the key bit sequence. Each command presents one bit of the key bit sequence which is compared with a next sequential lock bit. When this instruction is performed and the lock write enable flip-flop is in the set state following an erase operation, it causes the bit presented by the instruction to be written into the designated lock bit location of a memory block.

End Instruction (33H)

This command is performed once by ACP 10 to close or complete the key validation operation. It samples the state of the accumulated comparison flip-flop, tests the end counter and enables the setting of the block's access control storage element if the results are correct. When this instruction is performed and the write lock bit enable flip-flop is in the set state, it causes the resetting of the lock write enable flip-flop to a binary ZERO state for terminating a lock bit write operation in addition to setting the block's access control storage element for providing access.

While in accordance with the provisions and statutes there has been illustrated and described the best form of the invention, certain changes may be made without departing form the spirit of the invention as set forth in the appended claims and that in some cases, certain features of the invention may be used to advantage without a corresponding use of other features.

What is claimed is:

1. A secure memory card for use with a host portable computer, said memory card comprising:

a microprocessor connected for transmitting and receiving address, data and control information to and from said host computer and said microprocessor including:

an addressable non-volatile memory for storing information including a number of preestablished key values, each key value having a length no greater than a predetermined number of bits;

an internal bus connected to said microprocessor for transmitting address, data and control information defining memory operations to be performed by said card; and, at least one non-volatile addressable memory being connected to said internal bus in common with said microprocessor for receiving said address, data and control information, said memory including a memory section and a security section, said memory section containing a non-volatile memory array organized into a number of blocks, each block having a plurality of addressable multibit locations, at least a predetermined bit location of each one of a predetermined number of said plurality of said locations being designated as a lock bit location for storing a different bit of a key value which collectively provide a serially addressable group of lock bit locations available for storing said predetermined number of bits and control logic means for performing said memory operations and said security section being connected to said control logic means and to said memory section, said security section including:

an access control memory having a plurality of addressable storage elements, a different one being assigned to each of said number of blocks of said non-volatile array; and, a security access control unit coupled to said access control memory, to said internal bus and to said control logic means, said security access control unit in response to signals received from said control logic means performing a key verification operation by serially comparing each key bit of one of said key values with each of the corresponding bits stored in said group of lock bit locations of a designated block and generating an output signal for switching one of said plurality of addressable storage elements to enable reading of information from a corresponding one of said blocks only when said key verification operation is successfully performed.

2. The memory card of claim 1 wherein said security section comprises:

bit compare logic means coupled to said non-volatile memory array, to said control logic means and to said internal bus for serially comparing said key bit of said one of said key values with said each corresponding bits stored in said group of lock bit locations, said bit compare logic means generating a first output signal for signaling a result of each comparison;

an accumulation compare storage element coupled to said bit compare logic means for receiving said output signal, to said control logic means and to said access control memory, said accumulator compare storage element generating a second output signal for indicating no miscomparison in any bit comparisons successively made by said bit compare logic means and, an end counter coupled to said non-volatile memory array, to said control logic means and to said access control memory, said end counter generating a third output signal for indicating that all of said bits stored in said group of lock bit locations have been read out from said memory, said second and third output signals jointly causing said switching of said one of said plurality of storage elements.

3. The memory card of claim 2 wherein said control logic means includes an address latch counter and command register coupled to said memory array and to said internal bus for storing addresses and commands respectively received from said internal bus, said register in response to a first type of command generating signals for setting said accumulation compare storage element to a predetermined state, resetting said end counter to zero and for loading said address latch counter with most significant bits of an address associated with said command and for making middle significant bits of said address zeros.

4. The memory card of claim 3 wherein said first command is a start instruction, said predetermined state is a binary ONE state and wherein said address latch counter has a plurality of storage sections for storing said most significant bits, said middle significant bits and least significant bits of said address obtained from said start instruction.

5. The memory card of claim 3 wherein said command register in response to each second type of command generates signals for incrementing by one, said end counter only when said first output signal is generated by said bit compare logic means, for switching said accumulation compare storage element from said predetermined state to another state in the absence of said first output signal and for resetting said end counter when said end counter advances beyond a predetermined maximum count producing an overflow condition.

6. The memory card of claim 5 wherein said second type of command corresponds to a step instruction and wherein said maximum count corresponds to a predetermined number of ONE bits occurring in a key value which signal an end of said key value.

7. The memory card of claim 3 wherein said command register in response to a third type of command generates signals for setting to a predetermined state, one of said access control storage elements designated by said most significant address bits when said end counter has been advanced to a maximum count and said accumulation compare storage element is in said predetermined state.

8. The memory card of claim 7 wherein said third type of command corresponds to an end instruction and wherein said signals reset said end counter and accumulation compare storage element to zeros when either said end counter has not advanced to said maximum count or said accumulator compare storage element in not in said predetermined state.

9. The memory card of claim 1 wherein said memory section further includes erase control means coupled to said memory for performing a selective block erase operation on one of said number of blocks of said non-volatile memory array and wherein said security section further includes a lock write allow storage element coupled to said erase control means and to said control logic means, said lock write allow storage element being switched to a predetermined state upon completion of each selective block erase operation, said lock write allow storage element when in said predetermined state inhibiting said control logic means from performing any write operation on said non-volatile memory array during a period of time that said lock write allow storage element remains in said predetermined state.

10. The secure memory card of claim 9 wherein said lock write allow storage element is switched from said predetermined state to another state in response to said microprocessor applying a predetermined type of command to said internal bus.

11. The secure memory card of claim 10 wherein said predetermined type of command corresponds to an end instruction which is used to indicate completion of said selective erase operation.

12. The secure memory card of claim 9 wherein said information stored in said addressable non-volatile memory of said microprocessor further includes configuration information coded for designating which of said number of blocks of said non-volatile memory is to be protected and wherein said microprocessor executes a predetermined sequence of commands for writing bits of one of said preestablished key values into said serially addressable group of lock bit locations of an erased block which is designated as protected by said configuration information.

13. The secure memory card of claim 12 wherein said predetermined sequence of commands includes a first type of command for setting a first lock bit location of said group of lock bit locations of said erased block to a predetermined state for ensuring protection of information subsequently loaded into said addressable multibit locations of said erased block.

14. The secure memory card of claim 13 wherein said predetermined state is a binary ZERO state requiring that information subsequently loaded into said erased block must be erased in order to reset said first lock bit location to enable access to said information and wherein said first type of command is start command.

15. The secure memory card of claim 13 wherein said predetermined sequence of commands includes a number of second type of commands, each second type of command causing a different one of said bits of one of said key values to be serially written into other lock bit locations of said group until all of said bits of said one of said key values have been stored.

16. The secure memory card of claim 15 wherein each of said key values is coded according to a predetermined protocol pattern.

17. The secure memory card of claim 15 wherein said second type of command is a step instruction and said number of said second type of commands corresponds to a number of bits contained in said key value.

18. The secure memory card of claim 15 wherein said predetermined sequence of commands includes said predetermined command as a last command in said sequence, said predetermined command setting one of said plurality of addressable storage elements of said access control memory to a predetermined state for enabling access to said erased block for loading said storage locations with information thereby completing said selective block erase operation.

19. The secure memory card of claim 16 wherein said predetermined protocol pattern contains a predetermined number of successive binary ONE bit for signaling an end of said key value.

20. The secure memory card of claim 1 wherein said information stored in said addressable non-volatile memory of said microprocessor further includes configuration information coded for designating which ones of said number of blocks of said non-volatile memory are to be protected and wherein said microprocessor further includes commands for configuring said non-volatile memory array according to said configuration information, said commands causing said control logic means to set first lock bit locations of all of said blocks designated as protected by said configuration information, to write bits of corresponding ones of said key values into said groups of lock bit locations of all of said blocks designated as protected and to set to a predetermined state, all of said storage elements of said access control memory assigned to protected blocks thereby enabling information to be loaded therein for completing initial configuring of said non-volatile memory array.

* * * * *